(12) United States Patent
Yokota et al.

(10) Patent No.: US 8,564,440 B2
(45) Date of Patent: Oct. 22, 2013

(54) RFID SYSTEM, RFID CABLE SYSTEM, AND RFID CABLE LAYING METHOD

(75) Inventors: Toshimi Yokota, Hitachiohta (JP); Kenji Araki, Mito (JP); Kenji Utaka, Hitachi (JP); Noritaka Matsumoto, Hitachi (JP); Masatoshi Takada, Hitachi (JP); Ryosuke Shigemi, Hitachi (JP); Chikara Ota, Souma (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/418,821

(22) Filed: Mar. 13, 2012

(65) Prior Publication Data
US 2012/0169479 A1 Jul. 5, 2012

Related U.S. Application Data

(63) Continuation of application No. 11/553,642, filed on Oct. 27, 2006, now Pat. No. 8,159,346.

(30) Foreign Application Priority Data

Oct. 28, 2005 (JP) ................................ 2005-313679

(51) Int. Cl.
G08B 13/14 (2006.01)
(52) U.S. Cl.
USPC ................. 340/572.1; 340/568.1; 340/539.1
(58) Field of Classification Search
USPC ............ 340/572.1, 568.1, 539.1, 572.7, 10.1, 340/539.11
See application file for complete search history.

(56) References Cited

U.S. PATENT DOCUMENTS

| 5,483,467 | A |   | 1/1996  | Krupka et al. |
|-----------|---|---|---------|--------------|
| 5,689,242 | A | * | 11/1997 | Sims et al. .................... 340/652 |
| 5,905,249 | A |   | 5/1999  | Reddersen et al. |
| 6,784,802 | B1| * | 8/2004  | Stanescu ....................... 340/687 |
| 6,847,856 | B1|   | 1/2005  | Bohannon |
| 6,968,994 | B1|   | 11/2005 | Ashwood Smith |
| 7,170,393 | B2| * | 1/2007  | Martin ......................... 340/10.1 |
| 8,159,346 | B2| * | 4/2012  | Yokota et al. .............. 340/572.1 |

(Continued)

FOREIGN PATENT DOCUMENTS

| JP | 11-234710   | 8/1999 |
| JP | 2001-035266 A | 2/2001 |

(Continued)

Primary Examiner — Daniel Previl
(74) Attorney, Agent, or Firm — Mattingly & Malur, PC

(57) ABSTRACT

When an RFID is attached to an object to assist testing operations, the following problems are encountered; (1) the RFID of write type tends to cause a failure and is troublesome due to the necessity of rewrite each time the situation is changed, (2) the incorporation of the reader function in a terminal block increases the cost, and (3) the known techniques are targeted for only the connecting operation and are not adapted for a sequence test that takes the most expense in time and effort. The operations are aided by using an RFID reader and a terminal having the function for accessing a database of circuit information, RFID information, and test procedure information.

8 Claims, 19 Drawing Sheets

(56) References Cited

U.S. PATENT DOCUMENTS

| | | | |
|---|---|---|---|
| 2002/0082802 A1* | 6/2002 | Stringer et al. | 702/159 |
| 2003/0174099 A1* | 9/2003 | Bauer et al. | 343/893 |
| 2006/0047448 A1* | 3/2006 | Cecil | 702/59 |
| 2007/0013487 A1 | 1/2007 | Scholtz et al. | |
| 2007/0102505 A1 | 5/2007 | Yokota et al. | |
| 2007/0132733 A1* | 6/2007 | Ram | 345/163 |
| 2007/0178742 A1 | 8/2007 | Shigemi et al. | |
| 2008/0133047 A1 | 6/2008 | Best et al. | |
| 2008/0172722 A1 | 7/2008 | Fujita et al. | |
| 2008/0273844 A1 | 11/2008 | Kewitsch | |
| 2009/0006164 A1 | 1/2009 | Kaiser et al. | |

FOREIGN PATENT DOCUMENTS

| | | |
|---|---|---|
| JP | 2003-114247 | 4/2003 |
| JP | 2004-038583 A | 2/2004 |
| JP | 2004-146068 A | 5/2004 |
| JP | 2004-219644 | 8/2004 |
| JP | 2004-349184 | 12/2004 |
| JP | 2005-204412 | 7/2005 |

* cited by examiner

FIG. 3

| ROW NUMBER | CABLE NUMBER | |
|---|---|---|
| X23 | | |
| 21 | C000100 | |
| 20 | | |
| 19 | | WIRE NUMBER 1 |
| 18 | | WIRE NUMBER 2 |
| 17 | | WIRE NUMBER 3 |
| 16 | | WIRE NUMBER 4 |
| 15 | | WIRE NUMBER 5 |
| 14 | | WIRE NUMBER 6 |
| 13 | C000200 | |
| 12 | | |
| 11 | | |
| 10 | | |
| 9 | | |
| 8 | | |
| 7 | | |
| 6 | | |
| 5 | | |
| 4 | | |
| 3 | | |
| 2 | | |
| 1 | | |

CC04 (pointing to rows 16/15)

FIG. 4

| ROW NUMBER | TERMINAL NUMBER | CABLE NUMBER | WIRE NUMBER | RFID | CONNECTED 1 DISCONNECTED 0 |
|---|---|---|---|---|---|
| 1 | 11 | EE55D02 | 1 | EFFFFFFF FBC04000 000023F4 9F661F4B | 0 |
| 1 | 10 | EE55D02 | 2 | EFFFFFFF FBC04000 00002331 CF03FF5E | 0 |
| 1 | 9 | EE55D02 | 3 | EFFFFFFF FBC04000 00002330 CF657016 | 0 |
| 1 | 8 | EE55D02 | 4 | EFFFFFFF FBC04000 0002358 AF41AFD0 | 0 |
| 1 | 7 | EE55D02 | 5 | EFFFFFFF FBC04000 00023CA 530559AC | 0 |
| 1 | 6 | EE55D02 | 6 | EFFFFFFF FBC04000 00002330 D09EC0B1 | 0 |
| 1 | 5 | EE55D02 | 7 | EFFFFFFF FBC04000 0002358 91308265 | 0 |
| 1 | 4 | EE55D02 | 8 | | -1 |
| 1 | 3 | EE55D02 | 9 | | -1 |
| 1 | 2 | EE55D02 | 10 | | -1 |
| 1 | 1 | EE55D01 | 1 | | -1 |
| 1 | 9 | EE55D01 | 2 | | -1 |
| 1 | 8 | EE55D01 | 3 | | -1 |
| 1 | 7 | EE55D01 | 4 | | -1 |
| 1 | 6 | EE55D01 | 5 | | -1 |
| 1 | 5 | EE55D01 | 6 | | -1 |
| 1 | 4 | EE55D01 | 7 | | -1 |
| 1 | 3 | EE55D01 | 8 | | -1 |
| 1 | 2 | EE55D01 | 9 | | -1 |
| 1 | 1 | EE55D01 | 10 | | -1 |

FIG. 5

| |
|---|
| KENTARO HITACHI |
| 2000.5.17 |
| NOT COMPLETED |
| CONNECTION (SPECIFICATIONS) |
| TEST (SPECIFICATIONS) |
| REMOVAL (SPECIFICATIONS) |
| END |

FIG. 6
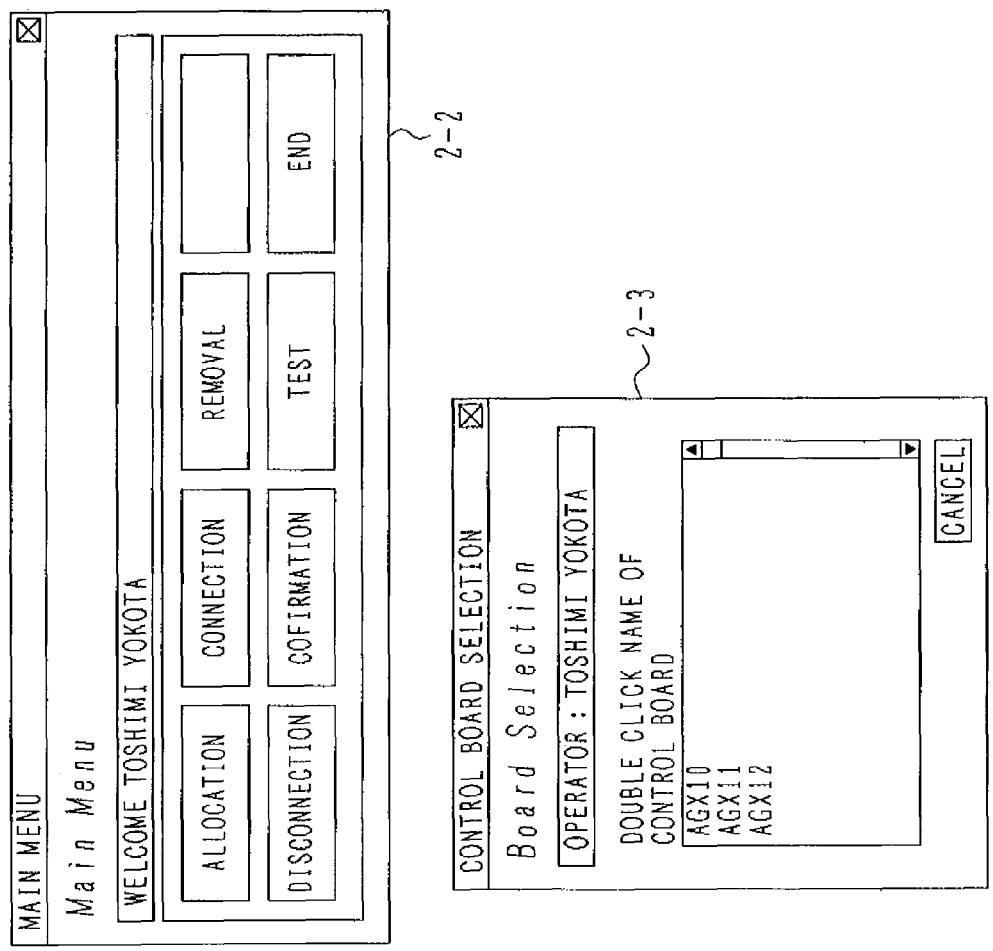
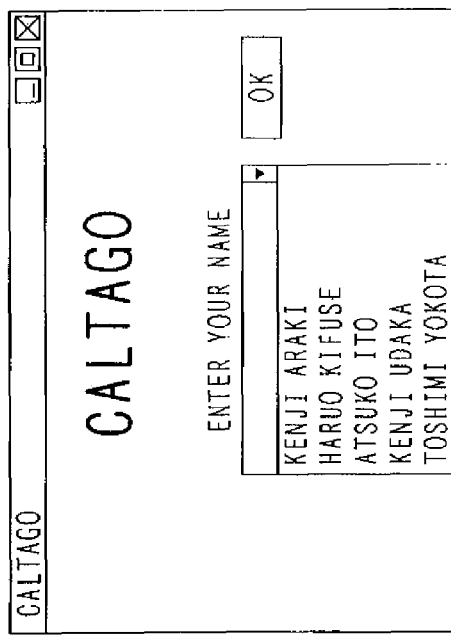

FIG.7

ALLOCATION MODE

*Allocation Mode*

OPERATOR : TOSHIMI YOKOTA

CABLES NOT YET ALLOCATED

01 C22478B1
○○ xxx

CABLES ALREADY ALLOCATED

02 C22478B1
03 C22478B1
01 C22478D1
02 C22478D1
03 C22478D1
01 C22478F1
02 C22478F1
03 C22478F1
01 C27300A3
02 C27300A3
03 C27300A3
01 C27300B3
02 C27300B3

CANCEL  END 2-5

RFID SET

*Rfid Set*

OPERATOR : TOSHIMI YOKOTA

CANCEL  END 2-6

CONFIRMATION OF ALLOCATED CABLES

*Confirmation*

OPERATOR : TOSHIMI YOKOTA

CLICK WIRE COLOR
《CABLE NUMBER : C22478B1 WIRE NUMBER : 03》

CANCEL 2-7

| CABLE NUMBER | NUMBER OF CHIPS | START NUMBER | END NUMBER |
|---|---|---|---|
| C000100 | 100 | 1 | 100 |
| C000200 | 300 | 101 | 400 |
| .... | | | |

① FORM [μ-RIBBON] AND ROLL IT LIKE ROLLED CAKE
② SHIPMENT CABLE WITH DATA INDICATING ORDER OF ARRANGED RFID
③ AFTER CUTTING, KEEP CABLE ID AND ID FOR EACH OF CABLE OPPOSITE ENDS

FIG.19

FIG. 20

RFID SYSTEM, RFID CABLE SYSTEM, AND RFID CABLE LAYING METHOD

This application is a continuation of U.S. patent application Ser. No. 11/553,642, filed Oct. 27, 2006.

BACKGROUND OF THE INVENTION

1. Field of the Invention

The present invention relates to an RFID (Radio Frequency Identification) system.

2. Description of the Related Art

When electric cables are laid in plants, railways and buildings, work specifications are prepared from design circuit diagrams. While referring to the work specifications, workers perform laying, connecting, testing and removing operations. The operations are progressed as follows. First, the workers lay cables in a plant, for example, while referring to work instructions indicating the start point and the end point of each cable. FIG. 2 illustrates sequence information printed on paper and shows a sequence for a part of the entire plant. FIG. 3 illustrates information complementing the sequence information in FIG. 2 and shows a connection diagram of terminal blocks and cable wires which is printed on paper. The connecting and disconnecting operations are carried out while referring to FIG. 3. After the connecting and disconnecting operations, a sequence test is performed while referring to FIG. 2.

From the viewpoint of ensuring high reliability, human errors have to be eliminated from such cable laying work. Checking the operation results repeatedly is one solution, but repeated check leads to an increase of cost. In addition, such a solution cannot completely eliminate human errors because of just resorting to high consciousness of the individual workers.

To overcome that problem, Patent Document 1 (JP,A 2003-114247) discloses a technique of writing wiring information in an RFID (also called an RFID tag as required) and attaching it to a cable. Also, Patent Document 2 (JP,A 2004-349184) discloses a technique of attaching an RFID to a cable, incorporating the reader function in the terminal block side, and issuing an alarm if improperly wired connection is found. The former known technique employing the write type RFID is disadvantageous in tending to cause a failure and being troublesome due to the necessity of rewrite each time the situation is changed. Also, the latter known technique has a problem that the incorporation of the reader function in the terminal block increases the cost.

SUMMARY OF THE INVENTION

The problems to be solved by the present invention are as follows:
(1) The write type RFID tends to cause a failure and is troublesome due to the necessity of rewrite each time the situation is changed.
(2) The incorporation of the reader function in the terminal block increases the cost.
(3) The known techniques are targeted for only the connecting operation and are not adapted for the sequence test that takes the most expense in time and effort.

An object of the present invention is to solve the above-mentioned problems based on the following most important features:
(1) An RFID system holds RFID information indicating to which unit of equipment an RFID is attached.
(2) The reader function is provided on an operating terminal.
(3) Work is performed while reading the RFID.

According to the present invention, an RFID system capable of eliminating human errors and ensuring efficient work can be realized.

BRIEF DESCRIPTION OF THE DRAWINGS

FIG. 3 shows another example of the circuit information held in the data storage;
FIG. 4 shows one example of RFID information held in the data storage;
FIG. 5 shows one example of work procedure information held in the data storage;
FIG. 6 shows screen examples used in the system;
FIG. 7 shows screen examples used in the system;
FIG. 19 shows a screen example used in the system;
and
FIG. 20 shows a screen example used in the system.

DESCRIPTION OF THE PREFERRED EMBODIMENTS

One embodiment of the present invention will be described below with reference to the drawings.

Figure 1:
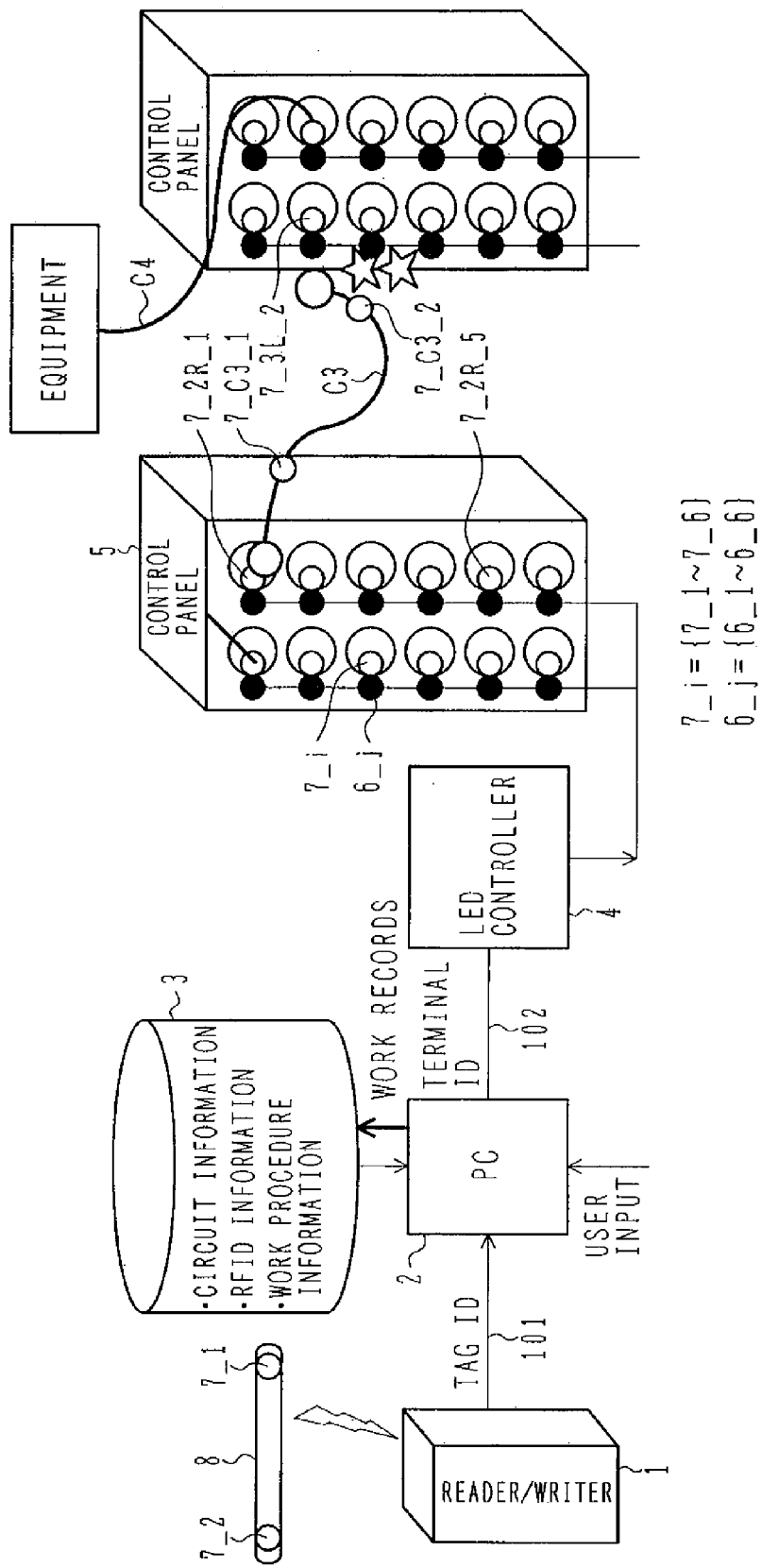
FIG. 1 illustrates one example of overall configuration of a cable laying system.

FIG. 1 illustrates one example of overall configuration of a cable laying system according to one embodiment of the present invention, and practical examples of information held in a data storage 3 are shown in FIGS. 2-5. Examples of operation of a PC 2 are shown in FIGS. 6-16.

A cable 8 in FIG. 1 is a cable connecting two terminals as indicated by a cable C3. One end of the cable is connected to a particular terminal of a control board 5. A reader 1 is an RFID reader which reads an ID stored for identification in an RFID (tag) and outputs the read ID (tag ID) to a signal line 101. The reader 1 repeats the read operation at intervals of a predetermined time or reads the tag ID at the timing when a trigger is applied from the PC 2 via a signal line 101. The PC 2 is constituted by any of a personal computer (PC), a personal digital assistant (PDA) or a small-sized microcomputer, and it is generally made up of a CPU, a memory, and a storage. In each operating mode, the PC 2 receives the ID (tag ID) read by the reader 1 via the signal line 101 and aids work by checking the read ID (tag ID) with not only circuit information, RFID information and work procedure information which are stored in the data storage 3, but also with commands for mode selection, object selection, etc. which are inputted from a user (worker). The data storage 3 may be prepared on a storage incorporated in the PC 2, or it may be a storage on the Internet, which is not incorporated in the PC 2. In the latter case, the PC 2 is required to have the communication function.

The circuit information means circuit information using a terminal ID and a cable ID, including information indicating connection between the terminal ID and the cable ID. By referring to the circuit information, it is possible to obtain, from the terminal ID, the cable ID to be connected, and conversely to obtain, from the cable ID, the terminal ID to be connected. In the following description, the cable ID is used as specifying either end of the cable. Instead of specifying either end of the cable, however, the cable ID may be used an ID for a cable having opposite ends such that those ends (starting end and terminating end) are separately managed. In such a case, the terminal ID to be connected can be specified by designating the cable ID and one of the opposite ends. Objects to which are attached RFIDs are not limited to the terminal and the cable. In this embodiment, the objects for attachment of RFIDs include a cable, an end of a wire, a control board, a control board terminal, a cable tray, a cable tray branch point, equipment to be controlled, and a principal point as a confirmation object in a sequence test. The circuit information has to be described by using those object IDs or IDs corresponding to the object IDs.

The RFID information indicates correspondence between the ID stored for identification in the RFID and the object ID representing the object to which is attached the RFID. By way of example, the cable ID representing one end of the cable 8 and the ID stored for identification in an RFID 7_1, which is attached near that end of the cable 8, are registered as the RFID information in correspondent relation. Although the objects for attachment of RFIDs in this embodiment include a cable, an end of a wire, a control board, a control board terminal, a cable tray, a cable tray branch point, equipment to be controlled, and a principal point as a confirmation object in a sequence test, the RFID information is similarly formed regardless of the kind of the object including other objects than mentioned above. By referring to the RFID information, it is possible to obtain, from the cable ID or the terminal ID, the ID stored for identification in the RFID, which is attached to an actual object represented by the cable ID or the terminal ID, and conversely to obtain, from the ID stored for identification in the RFID, the cable ID or the terminal ID.

The work procedure information means information indicating a work procedure, including a list of work details to be carried out by a worker in a certain day and procedures of individual operations, which are represented by the ID indicating the object to which is attached the RFID, or by the ID stored for identification in the attached RFID. An example of the list of work details to be carried out by a worker in a certain day will be described later with reference to FIG. 5. Assuming, as one example of the individual operations, an operation for confirming the connection between the terminal and the cable, the operation is progressed by prompting the worker to confirm the terminals included in a terminal block in order, and indicating the individual confirmation results to the worker. On that occasion, the confirmation order is represented by using the terminal ID or the cable ID, or the ID stored for identification in the RFID corresponding to the former, and is stored as the work procedure information. The work procedure is indicated to the user in a manner of changing color or blinking light of, on a diagram displayed as shown in FIG. 3, the terminal or the cable to be next confirmed, or illuminating an LED as described later, or displaying the terminal IDs or the cable IDs in the form of text rows.

Such a manner will be further described later in connection with other examples of the individual operations by referring to FIGS. 9 and 10.

When a terminal of the control board 5 is required to be indicated as a part of the work aid, an ID of that terminal is outputted to a signal line 102. An LED controller 4 receives designation of the terminal ID via the signal line 102, and upon receiving the designation, it illuminates an LED 6 representing the designated terminal. For example, when the terminal of the control board 5 is not required to be indicated, the signal line 102, the LED controller 4, the LED 6, and the work procedure information may be omitted from the system configuration. In the following, the RFID 7 is described as being a passive RFID and not having the write function. However, an RFID being of active type or having the write function is also similarly usable. The cable is made up of a plurality of wires. The RFID 7 is previously attached to any of the cable, the end of each wire, the control board, the control board terminal, the cable tray, the cable tray branch point, the equipment to be controlled, and the principal point as the confirmation object in the sequence test by bonding, embedding, or just placing the RFID.

The data storage 3 holds the above-described circuit information, RFID information, and work procedure information, as well as work records. All data of the information may be stored in a memory or a disk inside the PC 2, or may be stored in a server machine and obtained by the function of communicating with the server machine, which function is prepared in the PC 2, each time the occasion requires. Even in the case using the memory or the disk inside the PC 2, the data may be stored in the server machine such that data required for work is downloaded from the server machine before the work is started and work records are uploaded to the server machine after the work. Such a scheme makes it possible to share the information and to easily confirm the progress of the work.

As operating examples with the configuration shown in FIG. 1, the following modes are prepared. The worker starts work after depressing a desired button on a main menu in a screen 2-2 of FIG. 6 and setting one of the modes.

[1] Connection Mode:

(1) The reader/writer 1 reads the ID stored for identification in the RFID (tag) attached to the cable 8.

(2) The reader/writer 1 sends the read ID (tag ID) to the PC 2.

(3) The PC 2 obtains the cable ID corresponding to the read ID (tag ID) by referring to the RFID information stored in the data storage 3, and then obtains the terminal ID to which is to be connected the cable ID by referring to the circuit information, followed by sending the obtained terminal ID to the LED controller 4.

(4) The LED controller 4 obtains the LED number indicating the relevant terminal ID and illuminates the corresponding LED 6.

(5) In accordance with an instruction given from the illuminated LED, the worker connects the cable to the corresponding terminal.

Thus, when the RFID attached to the cable is read, the LED representing the terminal to be connected is illuminated in accordance with the connection decided in the circuit information, thus enabling that terminal to be indicated to the worker. Assuming, for example, that the right end of the cable 8 is to be connected to the second terminal of the control board in the left side counting from top, the LED 6 of the control board 5 arranged in the left side at a second position counting from top is illuminated.

In the connection mode described above, the terminal to be connected may be displayed on a PC screen instead of performing the above steps (4) and (5). For example, the connection diagram is displayed in a similar format to that indicating the terminal block shown in FIG. 3, and the corresponding terminal is highlighted by changing its color or blinking it. In such a case, the signal line 102, the LED controller 4, the LED 6, and the work procedure information may be omitted from the system configuration shown in FIG. 1.

[2] Confirmation Mode:

(1) The reader/writer 1 reads the RFID tag attached to the cable 8.

(2) The reader/writer 1 reads the RFID tag 7_i attached to the control board 5.

(3) The PC 2 obtains the cable ID corresponding to the read ID (tag ID) by referring to the RFID information stored in the data storage 3, and then obtains the terminal ID to which is to be connected the cable ID by referring to the circuit information. Also, the PC 2 obtains a terminal ID2 corresponding to the RFID tag 7_i of the control board 5 by referring to the RFID information.

(4) If the terminal ID and the terminal ID2 are matched with each other, the PC 2 determines the connection being proper and sends a signal to the LED controller 4 such that the terminal ID (exactly speaking, the corresponding LED) is illuminated. If the terminal ID and the terminal ID2 are not matched with each other, the PC 2 determines the connection being not proper and sends a signal to the LED controller 4 such that the terminal ID or the terminal ID2 is blinked. The determination as to the match or the mismatch may be performed by making a check after conversion to the cable ID.

(5) The corresponding LED 6 is illuminated or blinked.

In the confirmation mode described above, the match or the mismatch may be indicated by using a buzzer, for example, instead of above (5). In such a case, the signal line 102, the LED controller 4, the LED 6, and the work procedure information may be omitted from the system configuration shown in FIG. 1.

[2'] Alternate Confirmation Mode:

(1) From the work procedure information stored in the data storage 3, the PC 2 obtains the confirmation procedure for each terminal of the control board 5, i.e., an object for which the connection is to be confirmed. In the case of the terminal block having one vertical row of terminals, the test procedure (confirmation procedure) is performed, for example, by confirming the terminal connection from the top to the last successively. However, the confirmation may be performed in any other suitable order. The PC 2 sends a signal to the LED controller 4 such that the LED corresponding to the terminal ID for which the confirmation is to be made is blinked.

(2) The reader/writer 1 reads the RFID tag 7_i of the cable 8 connected to the terminal which is indicated by blinking of the LED.

(3) The PC 2 obtains the cable ID corresponding to the read ID (tag ID) by referring to the RFID information stored in the data storage 3, and then obtains a terminal ID2 to which is to be connected the cable ID by referring to the circuit information.

(4) If the terminal ID to be confirmed and the terminal ID2 to which is to be connected the cable ID are matched with each other, the PC 2 determines the connection being proper and sends a signal to the LED controller 4 such that the terminal ID (exactly speaking, the corresponding LED) is illuminated. If the terminal ID and the terminal ID2 are not matched with each, the PC 2 determines the connection being not proper and sends a signal to the LED controller 4 such that the terminal ID or the terminal ID2 is blinked.

(5) The corresponding LED 6 is illuminated or blinked.

[3] Disconnection Mode: The disconnection mode is carried out in a similar manner to that described above in [2](1) to (5). It is however preferable to display a screen allowing write of a memo, for example, in the case of mismatch in (4) so that the worker can write down notes as required.

[4] Test Mode: The LED is illuminated in accordance with the test procedural steps included in the work procedure information which is stored in the data storage 3. Details will be described below with reference to FIG. 2.

While the above description is made in connection the method of attaching the RFID to the cable wire, the RFID may be connected to a cable body. In such a case, the terminal block corresponding to the cable ID is displayed on the PC 2, but individual wires cannot be specified. It is therefore preferable to display all of the terminals related to all the wires in a highlighted way or to illuminate all the corresponding LEDs.

Practical examples of the information held in the data storage 3 in FIG. 1 are shown in FIGS. 2-5.

Figure 2:
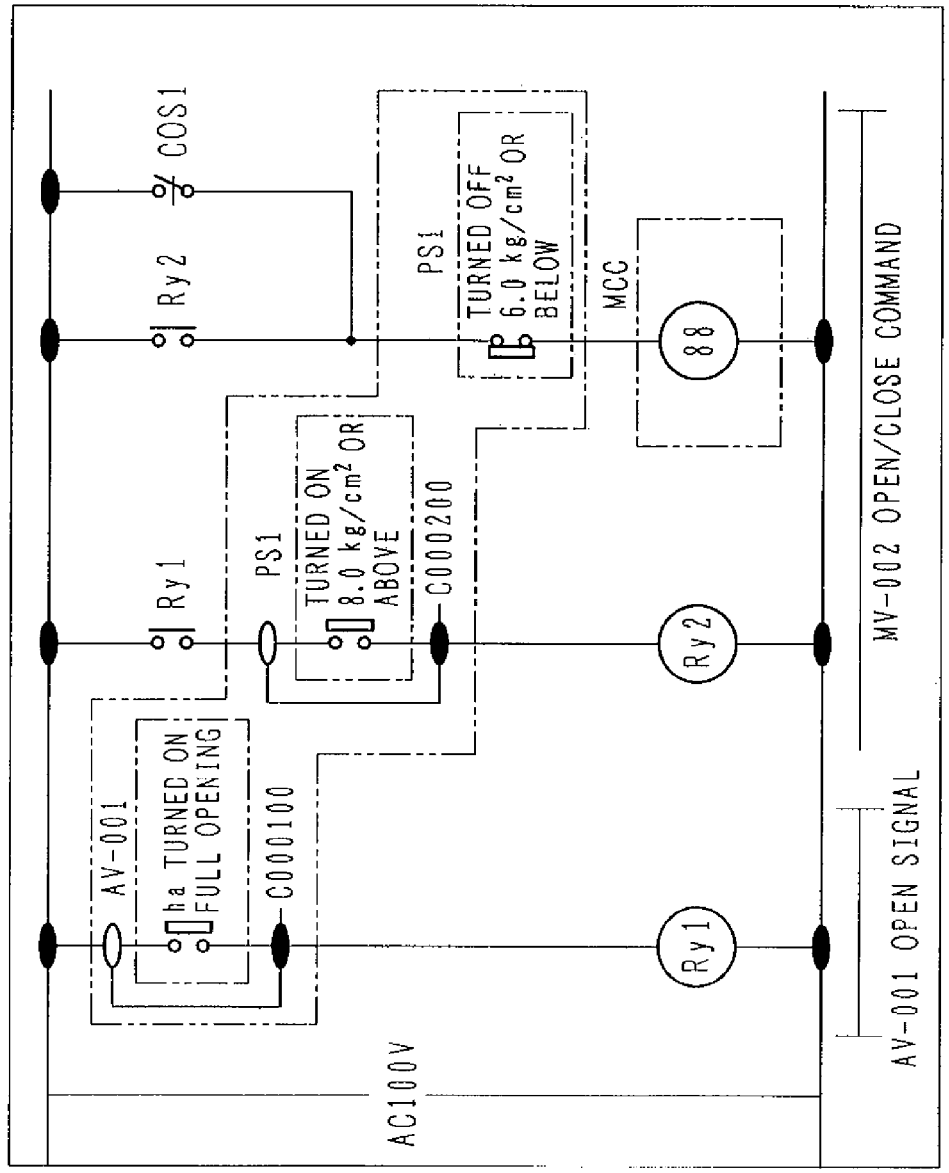
FIG. 2 shows one example of circuit information held in a data storage.

FIG. 2 shows, as a sequence diagram, one example of the circuit information held in the data storage. A circuit is made up of constituent elements, such as the cable, the end of each wire, the control board, the control board terminal, the cable tray, the cable tray branch point, the equipment to be controlled, and the principal point as the confirmation object in the sequence test. The circuit information is indicated by allocating specific IDs to those constituent elements. The result of the sequence test is confirmed successively from the left side. Although such circuit information is here shown in the form of a diagram, the circuit information is stored in the data storage 3 as a database including information capable of automatically producing the diagram.

FIG. 3 shows, as a terminal block wiring diagram, one example of the circuit information held in the data storage 3. Prior to starting the sequence test, the cable is required to be connected to the control board or an equipment terminal, thereby constituting a circuit. The terminal block wiring diagram represents data indicating the connecting operation to be performed for that purpose. Although such circuit information is here shown in the form of a diagram, the circuit information is stored in the data storage 3 as a database including information capable of automatically producing the diagram. As one example, information set in the first to fourth columns of FIG. 4, counting from the left side, corresponds to the relevant data. In other words, the relevant data is given by correspondence information (connection specifications) between the control board terminals and the cable wire terminals. More specifically, "X23" representing a row of the control board, shown in FIG. 3, corresponds to "row number" in the first column of FIG. 4, "1" to "21" each representing the terminal of the control board, shown in FIG. 3, corresponds to "terminal number" (of the control board) in the second column of FIG. 4. The position of a line representing each of the wires, shown in FIG. 3, corresponds to "wire number" in the fourth column of FIG. 4, and information representing the cable name such as "C000100", shown in FIG. 3, corresponds to "cable number" in the third column of FIG. 4.

FIG. 4 shows one example of the RFID information held in the data storage 3. The RFID information corresponds to the information set in the third to fifth columns of FIG. 4 counting from the left side, while it additionally contains information capable of automatically producing the diagram of FIG. 3. More specifically, the third to fifth columns of FIG. 4 hold the RFID information indicating that which RFID, indicated in the fifth column, is attached to which wire, indicated in the fourth column, of which cable, indicated in the third column.

In addition to the cable wire, for each of the cable, the control board, the control board terminal, the cable tray, the cable tray branch point, the equipment to be controlled, and the principal point as the confirmation object in the sequence test, similar RFID information is held which represents correspondence between the ID or the specific name used in the circuit information indicating those components and the value of the RFID that is bonded to, embedded in or just placed near the actual object.

FIG. 5 shows one example of the work procedure information held in the data storage 3. In other words, FIG. 5 shows a list of operations which are resulted from assigning the whole of work to individual workers to be carried out by each worker. In the shown example, data indicating the name of each worker, the date of work start, the date of work end or incompletion are entered in respective areas each having a fixed length. Further, a list of operations includes connection, test, and removal. Data indicating the end of the operation list is present at the last. Detailed specifications of each operation are designated in another area as described later with reference to FIG. 10.

An example of the operation of the PC 2 in FIG. 1 will be described below with reference to FIGS. 6-16.

2-1 in FIG. 6 shows a system log-in screen. One name is selected from a list of worker names registered in advance, and an OK button is depressed. Alternatively, the log-in may be started by reading RFIDs allocated to individual workers. In such a case, allocation information representing correspondence between the workers and the RFIDs must be prepared in advance as RFID information that is to be held in the data storage 3. After the log-in, the process shifts to a menu list screen (2-2 in FIG. 6). While all menu items may be displayed, the worker is able to more easily progress selection steps by displaying only work menu items to be next performed in accordance with the work procedure information. When the worker designates a certain menu item, corresponding one of the operating modes described above with reference to FIG. 1 can be set.

Figure 18:
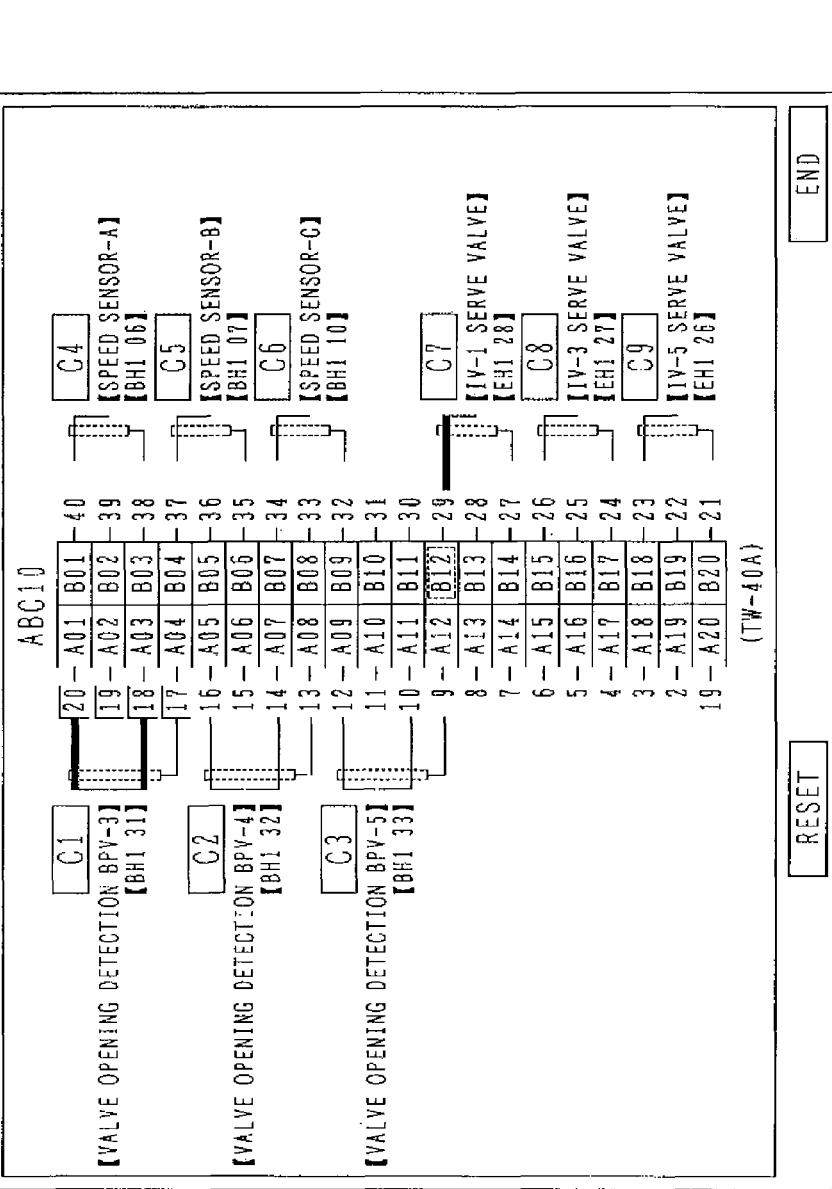
FIG. 18 shows a screen example used in the system.

The connection mode will be described below with reference to 2-3 in FIGS. 6 and 2-4 in FIG. 18. When the worker depresses a "connection" button from the main menu displayed as shown in 2-2 of FIG. 6, the system displays a work list, as shown in 2-3 of FIG. 6, for prompting the worker to select one of control boards or equipment for which the connection is to be performed. The worker selects one work object from the work list by clicking it. As an alternative, the manipulation to be made by the worker for the selection can be simplified by attaching an RFID to each of the control boards or the equipment and reading the RFID by a reader for the selection of the desired work object. When the worker selects the desired work object, the system shifts to the connection mode and displays a connection mode screen as shown in 2-4 of FIG. 18. The connection mode screen is preferably displayed in the same format as the above-described diagram of FIG. 3, which is called the terminal block wiring diagram, for convenience of the connecting operations. The diagram is automatically produced and displayed from the circuit information stored in the data storage 3. "ABC10" in 2-4 of FIG. 18 represents the name of the control board selected by the worker from the main menu screen shown in 2-3 of FIG. 6; namely, it means that the displayed diagram indicates information of the selected control board. Because the control board is usually constituted by two rows on the left and right sides, the diagram is also displayed in two rows, but it may be displayed in one row. "A01" to "B20" represent the names of terminals, and numerical values put on both sides of the two rows represent respective identification numbers of the terminals. "C1" to "C9" represent the names of cables, and descriptions of the cables are displayed under the names. Line segments shown near C1 represent that the cable C1 has three wires and another one wire is extended from a cable shield. When the wires have different colors, the line segments are preferably displayed in the same colors as the wires such that the worker can intuitively perceive the wires in an individually discriminated way. When the line segment is extended until reaching the identification number of the terminal like C1, it indicates that the corresponding wire is now in the connected state. On the other hand, when the line segment is not extended until reaching the identification number of the terminal like C2, it indicates that the corresponding wire is now in the disconnected state. When the RFID of the wire is read, the wire is displayed in a blinked manner, or the identification name or the identification number corresponding to the relevant wire is displayed in a highlighted manner (like C7) for easier recognition. In addition, whether the connection is established or not may be displayed near the cable or the terminal. During the connecting operation, some worker connects the wires in the order of the terminal number. To facilitate finding of the wire to be connected to the terminal, therefore, a process is required which, after reading one RFID, cancels the first RFID upon read of the next RFID so that the relevant worker can easily find the wires next by next by reading the respective RFIDs.

The confirmation mode will be described below. The confirmation mode is a mode for confirming whether the cable and the terminal are correctly connected to each other. Because the confirming operation is carried out for each control board, a screen similar to that shown in FIG. 18 is displayed. First, the identification name or the identification number of the terminal is displayed in color, e.g., gray, indicating that the confirmation is not yet completed. Then, the RFIDs on the cable side are read in the order of the terminal numbers. For the terminal to which is not connected the cable and for the terminal which is not required to make confirmation, the RFIDs on the terminal side are read. As a result of reading the RFIDs in such order, if the read data is matched with the circuit information (data), the confirmation is regarded as being completed. Whether the confirmation is completed or not yet completed must be indicated to the worker in an easily recognizable way, for example, by displaying a mark which indicates the completion of the confirmation. If the read data is not matched with the circuit information (data), in which terminal or cable occurs the mismatch is indicated to the worker in an easily recognizable way. When the mismatch is cleared as a result of error correction performed by the worker, the operation is brought to an end with the completion of the confirmation. When the mismatch is not cleared for the reason that the RFID cannot be read or that an action is necessitated which is to be made in the case of the connection incapable of being partly established, such fact is preferably recorded. For example, a "memo" menu button is disposed at the bottom of the screen shown in FIG. 18 such that a memo pad is opened when the "memo" menu button is depressed, thus allowing the worker to write down notes in the memo pad. While the memo pad may be in the form of a text, it is preferable to leave a written memo as handwriting by using a pen or a mouse, or to perform character recognition of the handwriting such that a text search can be made. When the confirmation mode is brought to an end for the reason of not-yet-completion of the confirmation with the memo affixed, such fact is also recorded in a work report.

Although, taking the connection mode as an example, the above description is made on an assumption that the RFIDs are attached in advance, it is important that the RFIDs are attached without errors. In other words, the RFID information stored in the data storage 3 has to be matched with the information of the RFID correctly attached to the actual components. If the RFIDs are incorrectly attached to the wires, the connecting operation is itself performed erroneously. An RFID attaching method for preventing such a problem will be described below with reference to FIGS. 7, 15 and 16.

Figure 15:
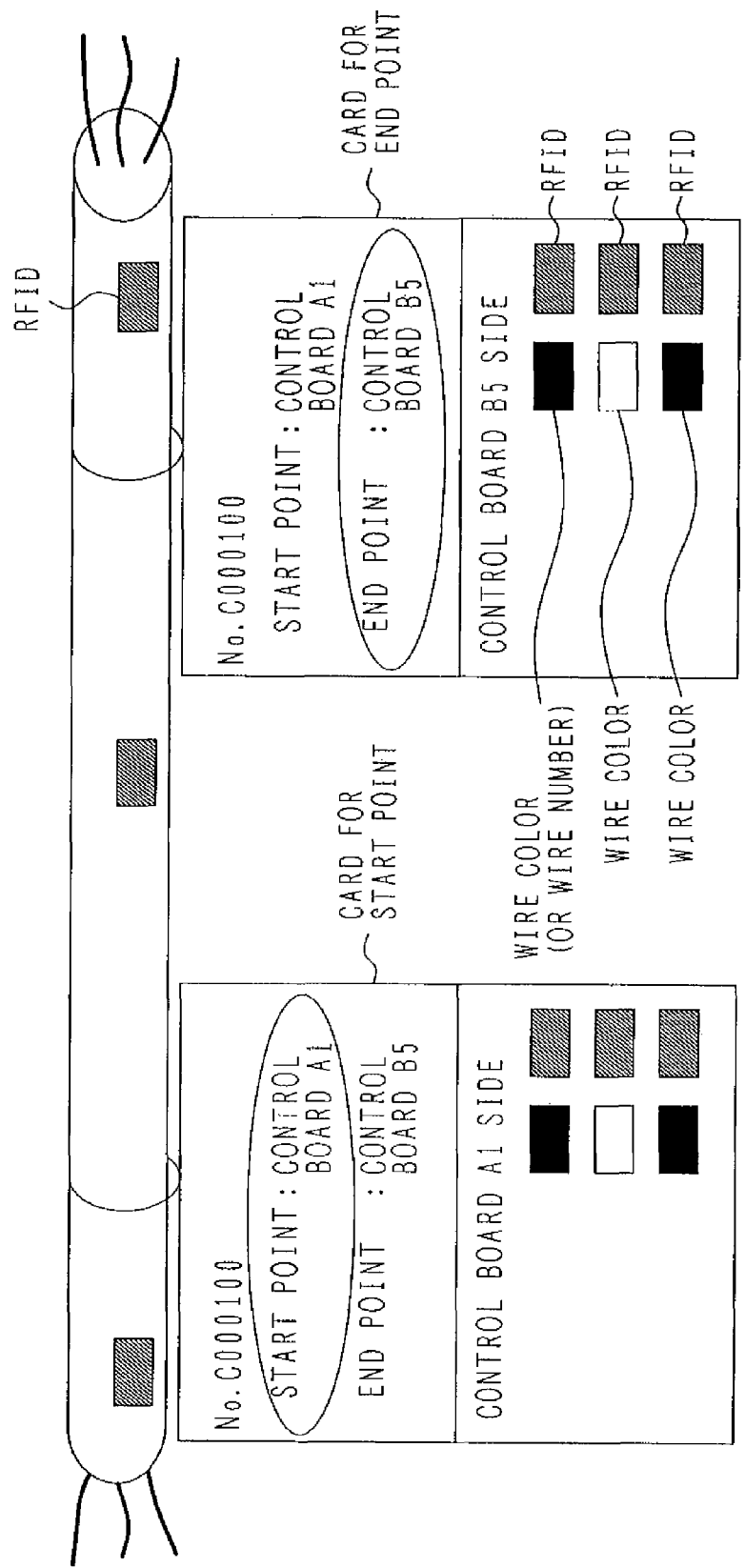
FIG. 15 is an explanatory view for explaining attachment of the tags to cable wires.
Figure 16:
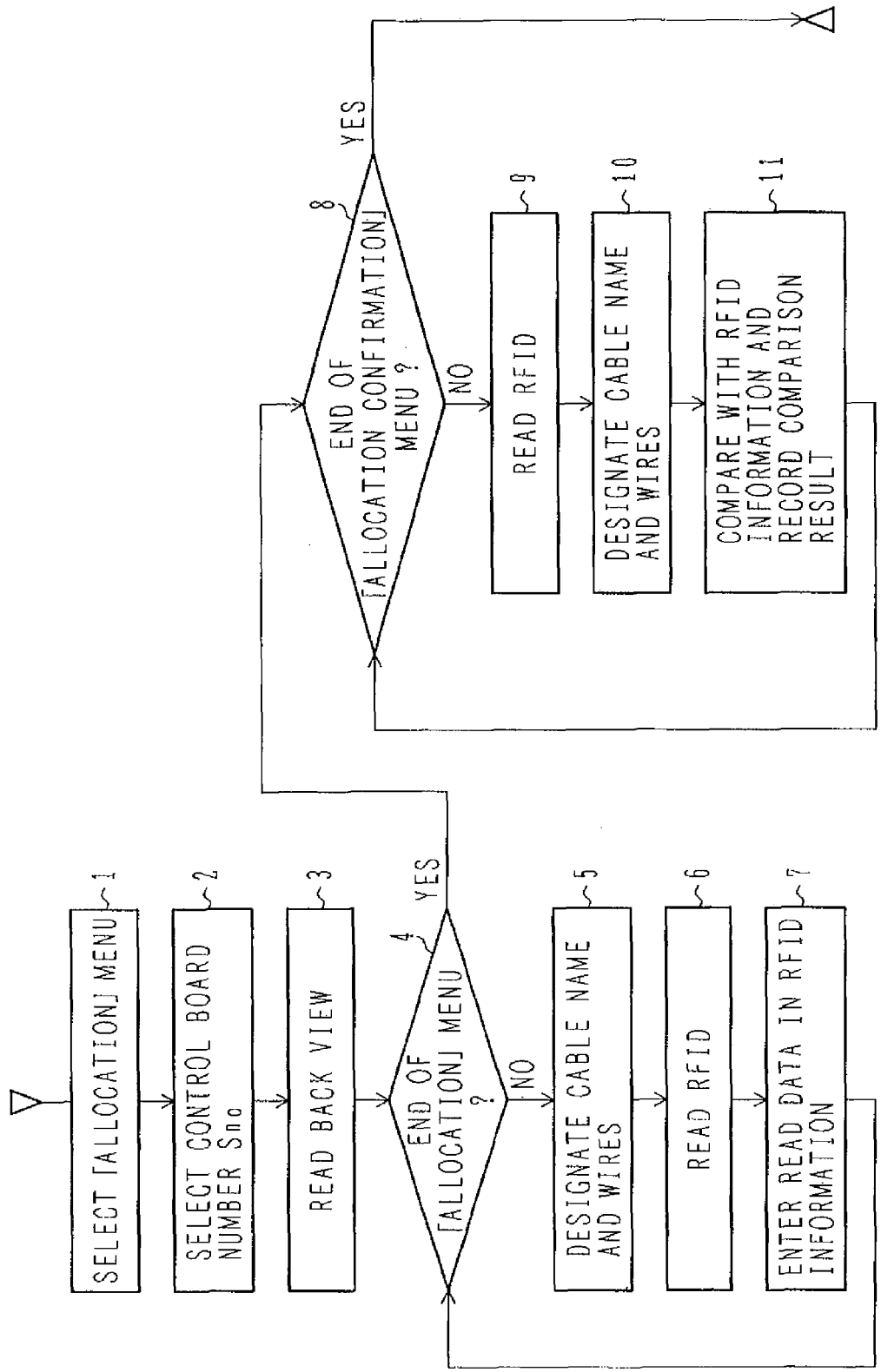
FIG. 16 is a flowchart of an allocation process.

According to the RFID attaching method, RFIDs to be attached to opposite ends of each wire are first prepared in the stage of making preparatory arrangement of a cable. For example, the RFIDs are prepared while cards indicating wires to be connected are hanged at opposite ends of the cable as shown in FIG. 15. Data of each RFID may be written in the RFID information in the stage of preparing the cards or in the stage of attaching the RFIDs in a site. To positively prevent errors in writing, after executing a process of (1) designating the cable name and the wires, (2) reading the data of each RFID, and (3) writing the read data in the RFID information as shown in 2-5 of FIG. 7, it is preferable to repeat another process of (2) reading the data of each RFID and then (1) designating the cable name and the wires in the reversed order. For example, the above step (2) of reading the RFIDs for the wires and the above step (1) of designating the cable name are carried out by reading the RFIDs if they are attached to the cable. The step of designating the wires is carried out by displaying a screen as shown in 2-7 of FIG. 7 and designating respective colors of the wires. FIG. 16 shows an allocation process flow. When the "allocation" mode button in 6-2 of FIG. 6 is selected in step 1, the process is shifted to the allocation mode. In step 2, a user designates a control board number Sno. At that time, the control board number Sno may be designated by reading the RFID which is previously attached to the control board and represents the control board number. Also, a list of cables may be displayed at that time. Information related to the selected control board number or the wires corresponding to the cable number is displayed. Stated another way, data related to the control board number is read from the back view, for example. Until the end of the "allocation" mode, steps 5 and 6 are repeated while attaching the RFIDs. More specifically, in step 5, the cable name and the wires are designated based on the list shown in 2-5 of FIG. 7. At that time, the cable name may be designated by reading the RFID which is previously attached to the cable and represents the cable. The designation of the wires is preferably set in an automatic manner successively from No. 1 as a default routine. Then, the RFID is read in step 6. Subsequently, in step 7, the RFID read in step 6 is made correspondent as the RFID information for the cable name and the wires which were designated in step 5, thereby updating the data of the RFID information in accordance with a system program. After the RFIDs are attached to all the wires, the system enters an allocation confirmation mode in which the RFID is read in step 9 and the cable name and the wires are then designated in step 10 in the order reversal to the above. If the results obtained in steps 9 and 10 are matched with the RFID information obtained in steps 5 and 6, the confirmation is regarded as being finished and a display is presented in a manner enabling the user to recognize which one of the wires has been confirmed and which one of the wires is not yet confirmed, for example, by changing the color of the cable wire having finished the confirmation in the screen shown in 2-5 of FIG. 7. After the end of the allocation confirmation mode is determined in step 8, it is ensured that the RFIDs attached to the cable and the control board, which are objects of the work at that time, are matched with the RFID information. Preferably, it is determined after the end of step 8, for example, whether a written guarantee can be issued or not.

Figure 8:
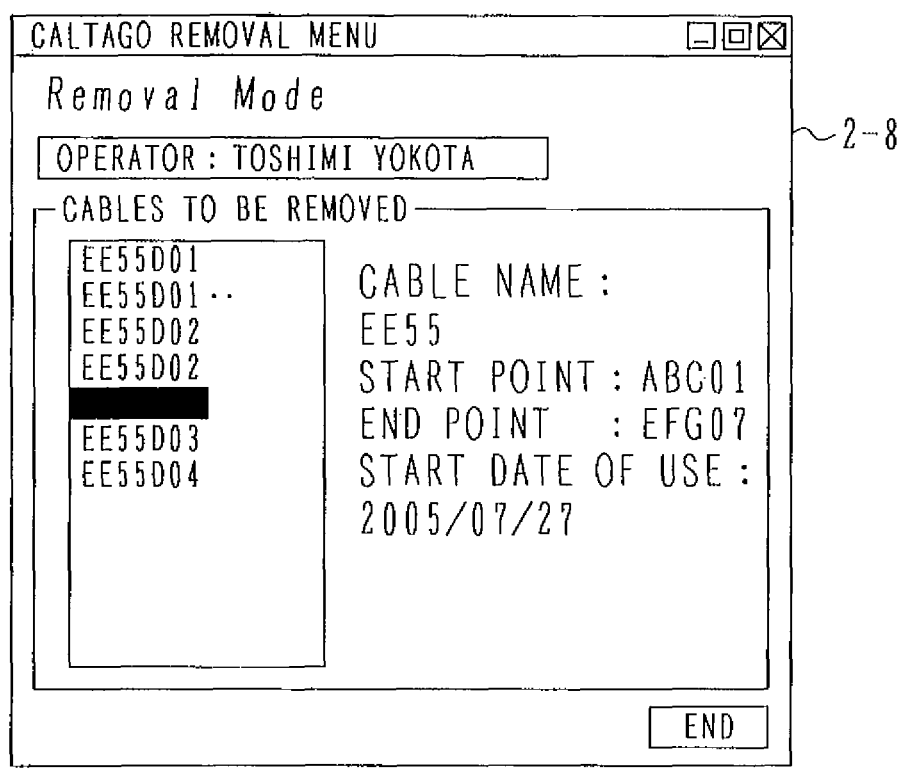
FIG. 8 shows a screen example used in the system.
Figures 12, 13:
FIG. 12 is a table showing one example of cable RFID information held in the data storage.
FIG. 13 is a table showing another example of the cable RFID information held in the data storage.
Figure 14:
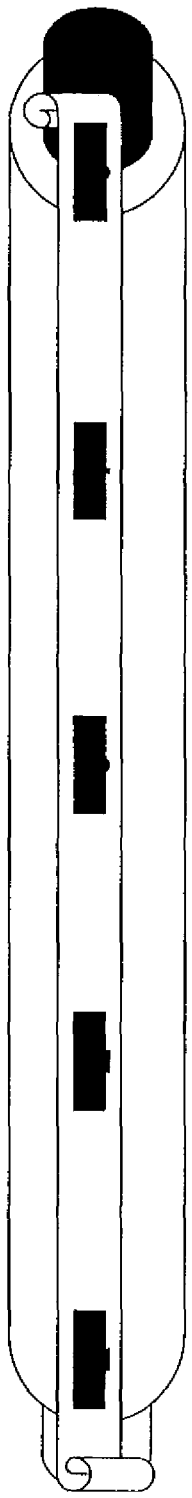
FIG. 14 illustrates a cable provided with RFID tags.

FIG. 8 shows a screen example in the removal mode. The name of each cable to be removed is displayed. When the RFID attached to the cable to be removed is read, that cable is displayed in a highlighted manner, and whether it is "removal" or the "not removal" is notified to the user in an easily recognizable manner by using voices or displaying characters. For that purpose, as shown in FIGS. 12, 13 and 14, RFIDs are required to be attached to the cable at various positions so that identification names in the circuit information for the relevant cable can be traced by reading those RFIDs. As an alternative, the identification names in the circuit information may be written in the RFIDs. FIG. 13 shows the RFIDs which are successively arranged before the cable is cut. The RFIDs are bonded to the cable when the cable is formed, and data of the RFIDs in the order of the bonding is employed. Alternatively, data may be obtained by bonding the RFIDs and then reading the bonded RFIDs. When the cable is cut and each cable identification name is defined, the RFIDs positioned near opposite ends of each cut cable are read and made correspondent to the cable identification name as shown in FIG. 12. As a result, to which cable the read RFID belongs can be traced by using the data shown in FIGS. 12 and 13. In other words, those data constitute the RFID information of the cable, which is held in the data storage 3. Further, by searching the circuit information based on the cable identification name, it is possible to know detailed information, such as the start point and the end point of the relevant cable.

An area on the right side of FIG. 8 displays the information of the cable to which is attached the RFID tag. The above-described process is also applicable to work in other mode than the removal mode by similarly tracing the information of the object to which is attached the RFID.

A manner of aiding the sequence test will be described below with reference to FIGS. 9, 10, 11 and 17.

Figure 9:
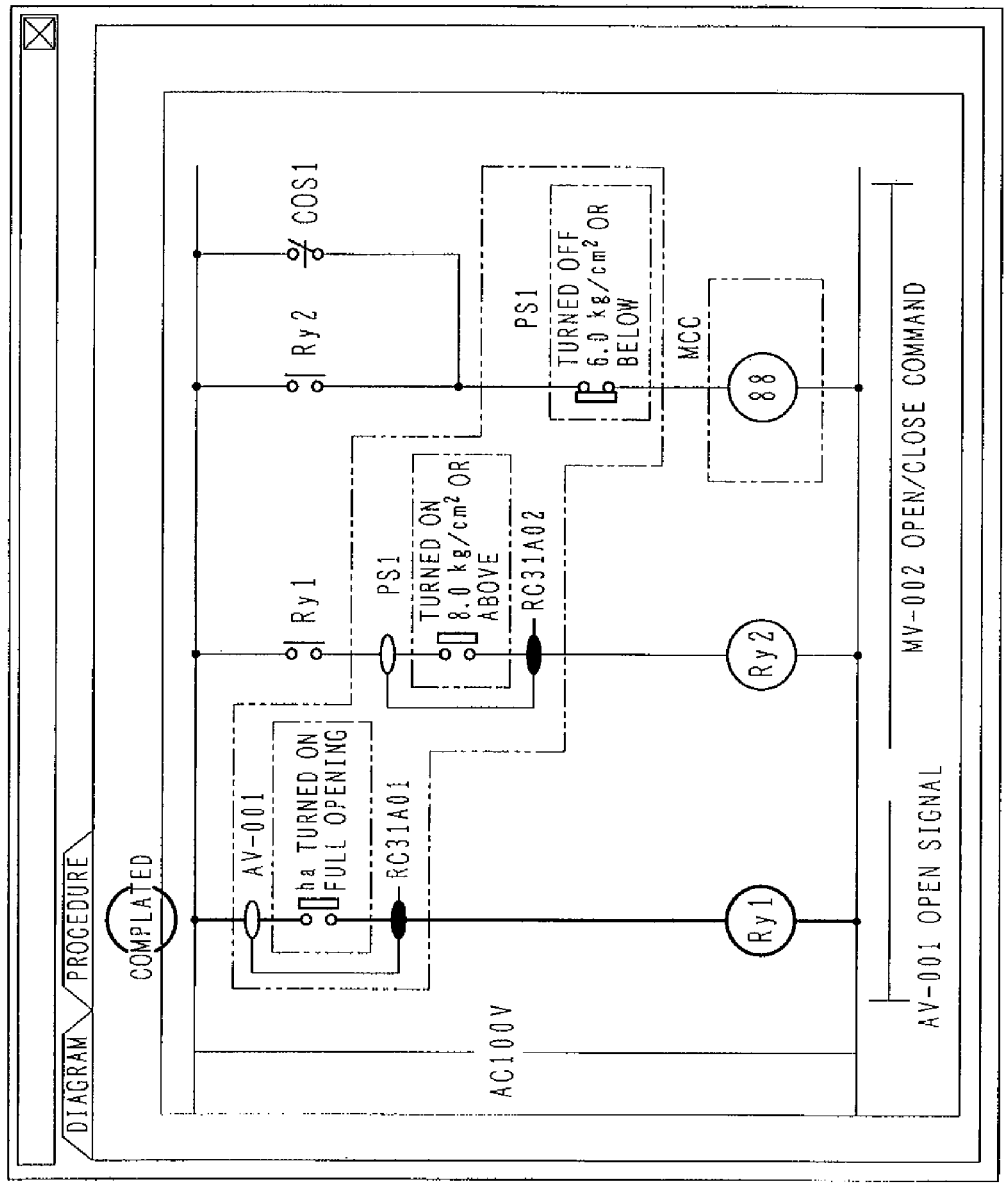
FIG. 9 shows a screen example used in the system.
Figure 10:
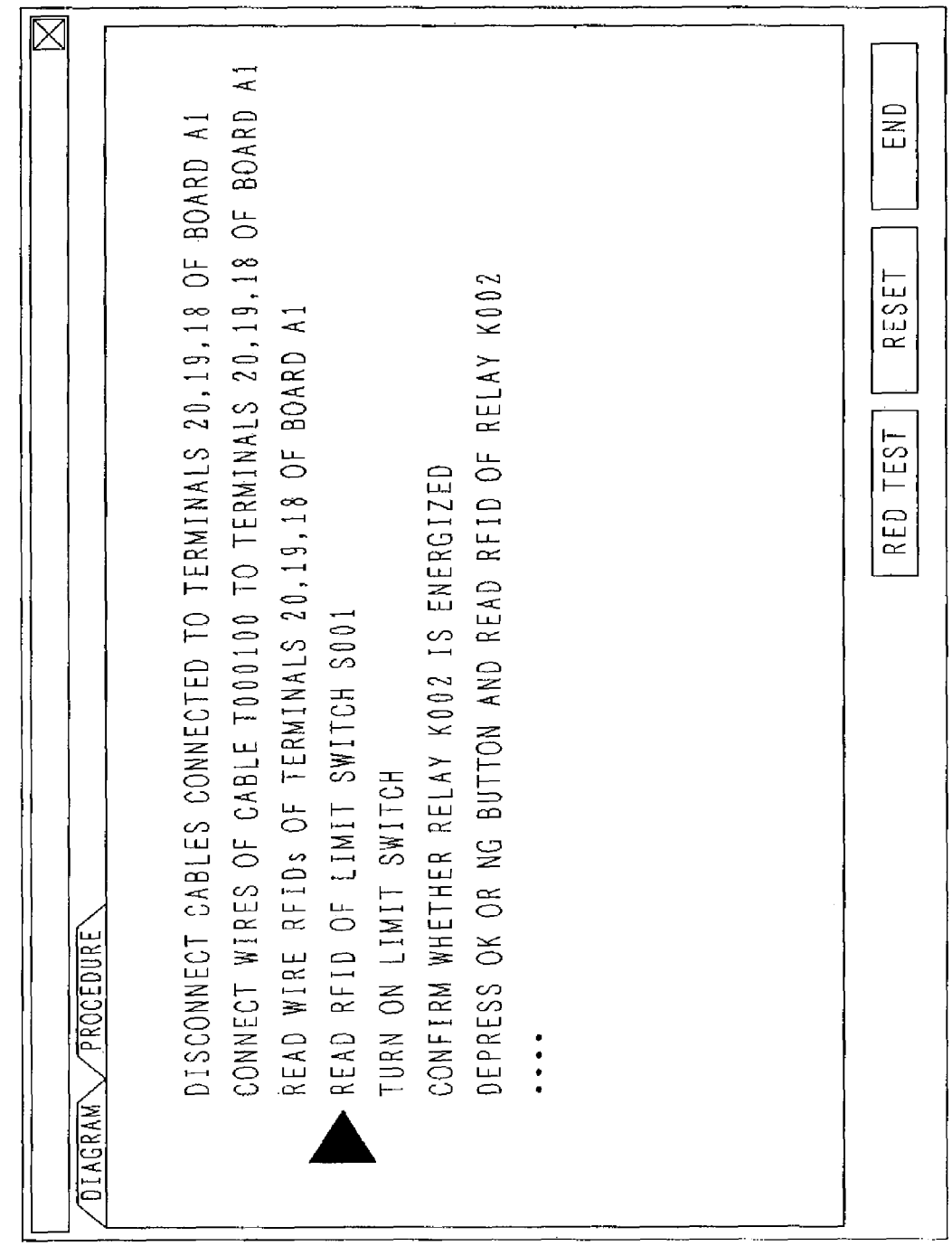
FIG. 10 shows a screen example used in the system.

In the sequence test mode, screens of FIGS. 9 and 10 are switchable from one to the other by clicking a tab. The screen of FIG. 9 displays a sequence diagram and indicates in which part of the diagram the sequence test has been completed. The screen of FIG. 10 displays a list of procedural steps and indicates to which one of the steps the procedure has been completed. The steps having been completed are displayed by thin characters, the steps which will be performed subsequently are displayed by bold characters, and the step to be next performed is indicated by a triangular mark. As shown in FIG. 10, by inserting a step of reading the RFID bonded to (or placed near) the object of the procedure, it is confirmed that the equipment of the object to be confirmed is correct. Further, the procedure information contains information indicating that the test in which part of the sequence diagram in FIG. 10 corresponds to which step of the procedure in FIG. 10, thus displaying that, in each step of the procedures in FIG. 10, to which part has been completed the sequence test in FIG. 9. Instead of displaying a list of the procedure steps, rough procedure items and a detailed procedure for each of those items may be displayed. This enables the skilled user to progress the work while referring to only the rough procedure, thus resulting in an increase of the working efficiency. When the work is progressed as per the procedure and the RFIDs having been read during the procedure are also as per designated, it is preferable to determine after the end of the sequence test whether a written guarantee ensuring the completion of work can be issued or not.

Figure 11:
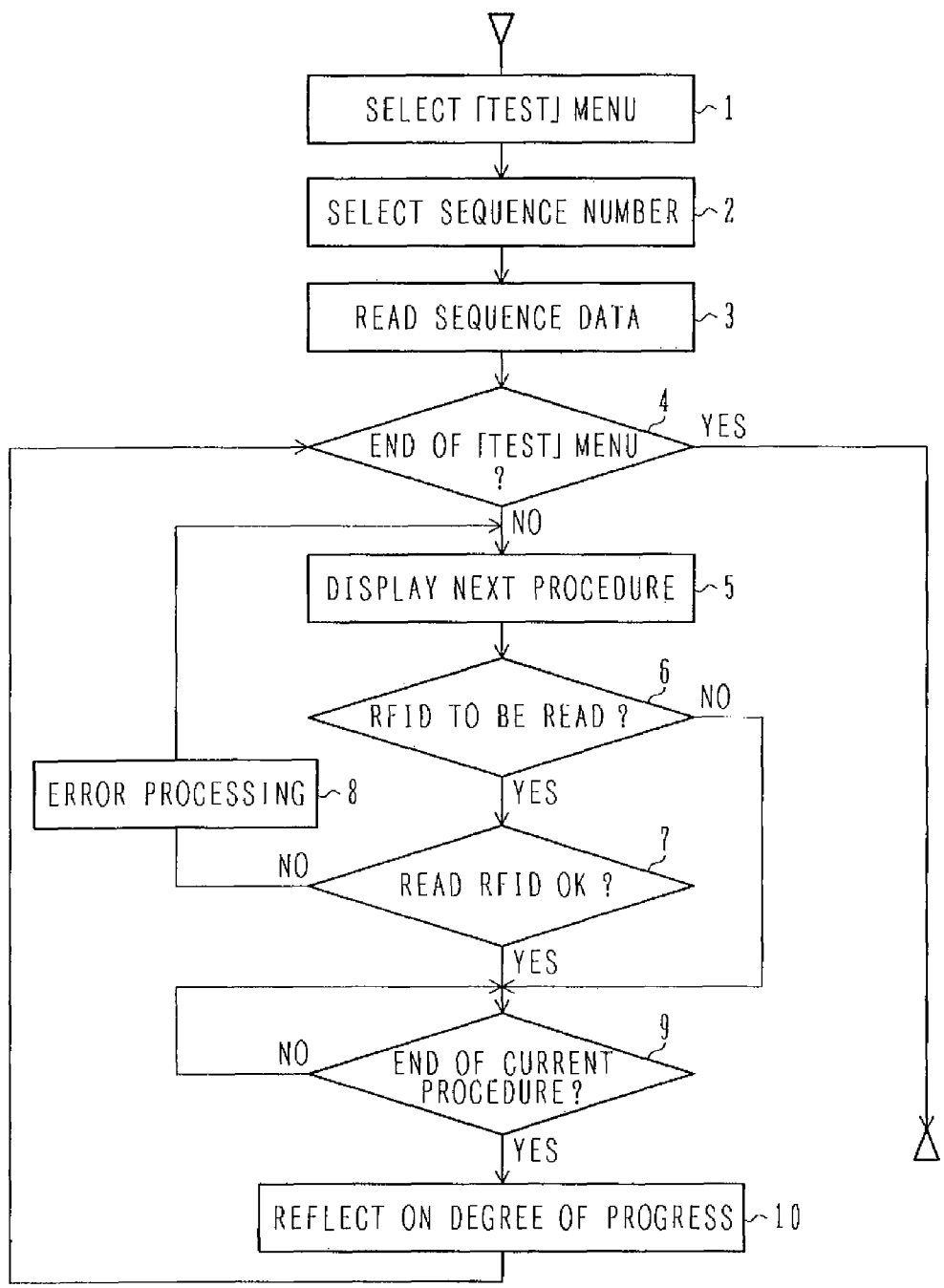
FIG. 11 shows a flow of sequence test procedural steps.

Steps of the sequence test will be described below with reference to FIG. 11.

When the worker (user) selects the "test" mode from the main menu in step 1, the process is shifted to the sequence test mode. In step 2, the worker is prompted to select the sequence number. As an alternative, the sequence number may be designated by reading the RFID which is previously attached to the object of the test, e.g., a control board. With the function of searching for the designated RFID and the testing operations to be carried out by the relevant worker from among the work procedure information shown in FIG. 5, it is possible to restrict candidates of the testing operations, to reduce the distance through which the worker must move, and to increase the working efficiency. The sequence data is read in step 3 to display the screens of FIGS. 9 and 10. Until the end of the "test" mode which is determined in step 4, step 5 and subsequent steps are repeated. More specifically, in step 5, the procedure to be next performed is displayed as shown in FIG. 10. If it is determined in step 6 that the current procedure includes a process of reading the RFID, the system waits for read of the RFID in step 7 and then determines whether the read RFID is matched with the designated RFID. If both the RFIDs are matched with each other (i.e., OK), the current procedure is brought to an end in step 9. If it is determined in step 6 that the current procedure does not include a process of reading the RFID, the current procedure is brought to an end after waiting for depression of an end-of-work button or an entry of an operating command instructing "end of the current procedure", e.g., an instruction of the next work item. Then, the completion of the current procedure is reflected on the degree of progress in step 10. If both the RFIDs are not matched with each other in step 7, error processing is executed in step 8.

In relation to step 7, the following is additionally included:

If the RFID is misread, the worker is prompted to read the RFID again, and if the read RFID is OK, the process flow advances to step 9.

If the RFID having been read again is not OK, or if the RFID cannot be read, the worker is prompted to write notes regarding the situation in a remark area in the course of the error processing.

In such a case, the work is continued or interrupted.

If the work is continued in that situation, such fact is recorded in a written work guarantee.

Figure 17:
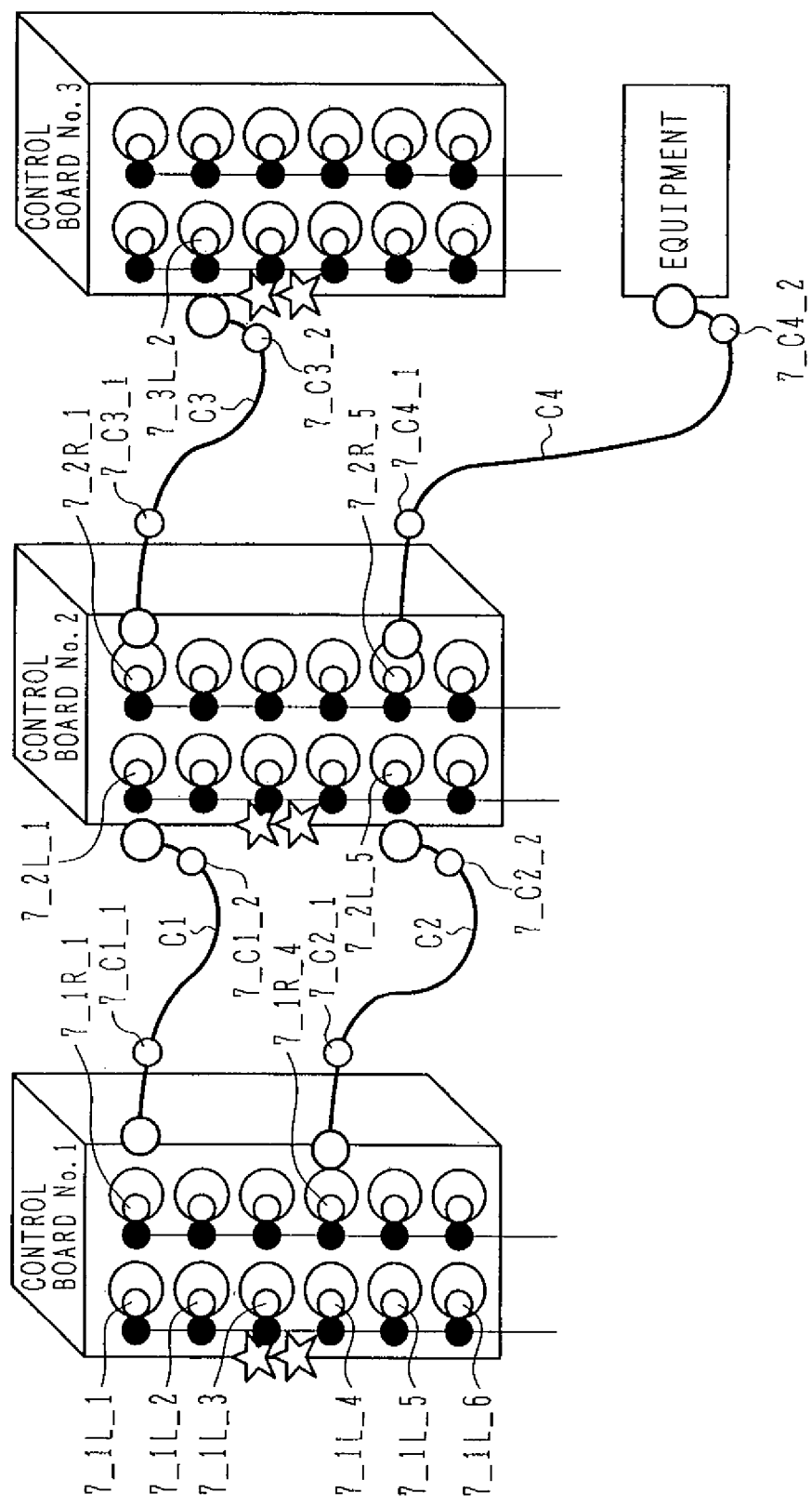
FIG. 17 illustrates an example of a test object sequence under a test mode.

FIG. 17 illustrates connection states in portions corresponding to each sequence. A cable C1 connects a terminal of a control board No. 1, which is represented by RFID (7_1R_1), and a terminal of a control board No. 2, which is represented by RFID(7_2L_1). For example, a sequence test No. 1 is performed to confirm the cables C1 and C3, and a sequence test No. 2 is performed to confirm the cables C1 and C4. If the work of the sequence test No. 1 is ended at date within a predetermined period, the test regarding the cable C1 in the sequence test No. 1 can be omitted. For that purpose, it is required to assign a specific ID to each partial sequence in the sequence diagram of FIG. 9, and to hold, in the procedure information, information indicating that each step of the procedure shown in FIG. 10 corresponds to which one of the tests assigned with the respective specific IDs. It is also required to store information indicating when each test assigned with the specific ID has been ended, and to refer to that information. With such an arrangement, the worker can check that partial sequences indicated by the same specific ID are present in separate sequence diagrams, and that the sequence test has been completed. If there is a partial sequence which has already been completed in the sequence test No. 1, a portion corresponding to the completed partial sequence can be displayed in a recognizable manner when the sequence diagram is displayed as shown in FIG. 9. By displaying the completed partial sequence as the completed step when the list of the procedural steps is displayed as shown in FIG. 10, the corresponding test step can be skipped.

By logging system operating situations (i.e., recording the time of each depression of the menu button, each read of the RFID, etc.) after the worker started up the system, it is possible to confirm how the work has been progressed. In other words, the logging enables collection of basic data indicating what kind of work takes expense in time and effort. Based on the collected basic data, the amount of operations required for each kind of work can be estimated from the cable length (in this case, the cable length for each cable ID must be also stored), the number of terminals, and/or the number of test procedural steps. As a result, work allocation among a plurality of workers can be performed in more appropriate manner.

Figure 19:
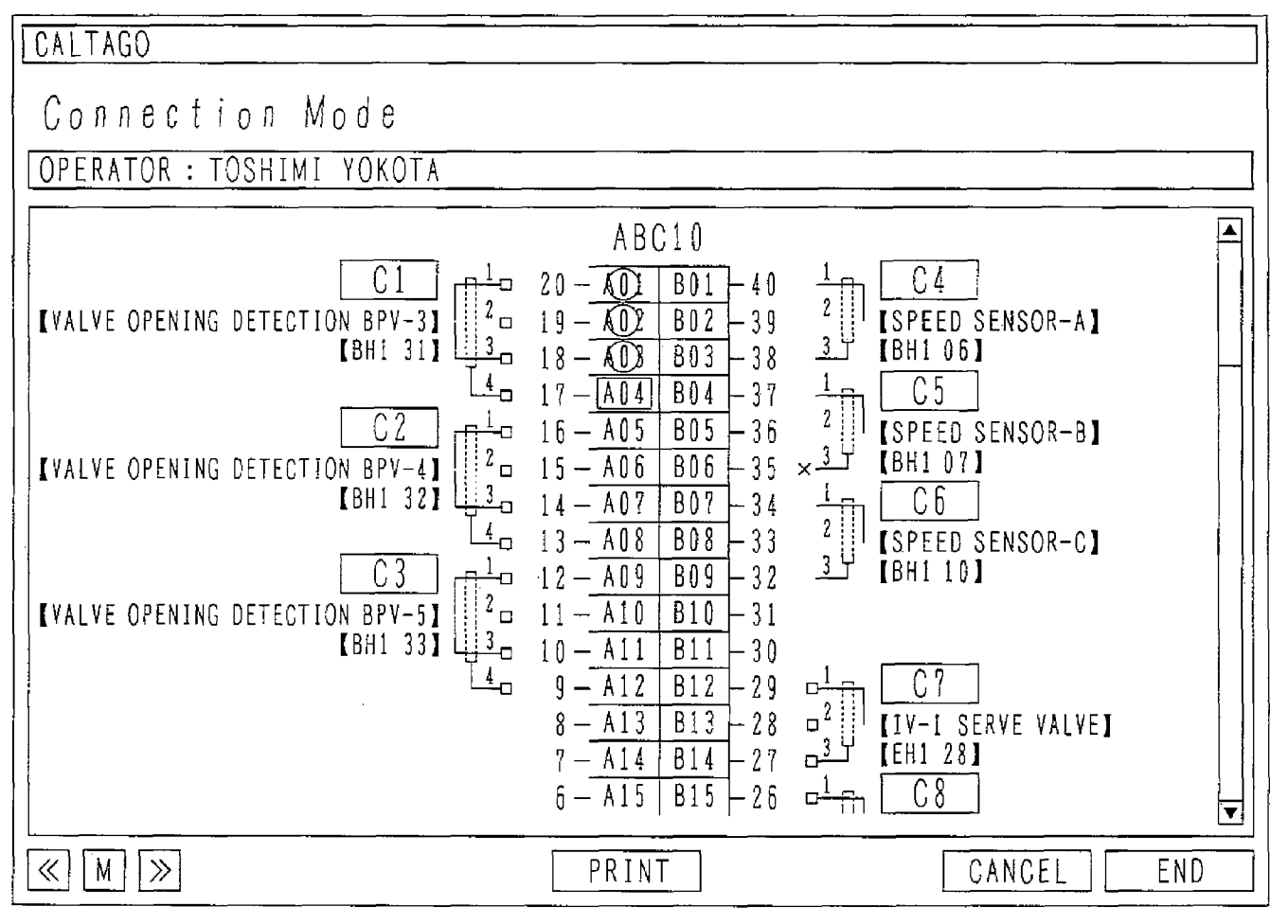
Figure 20:
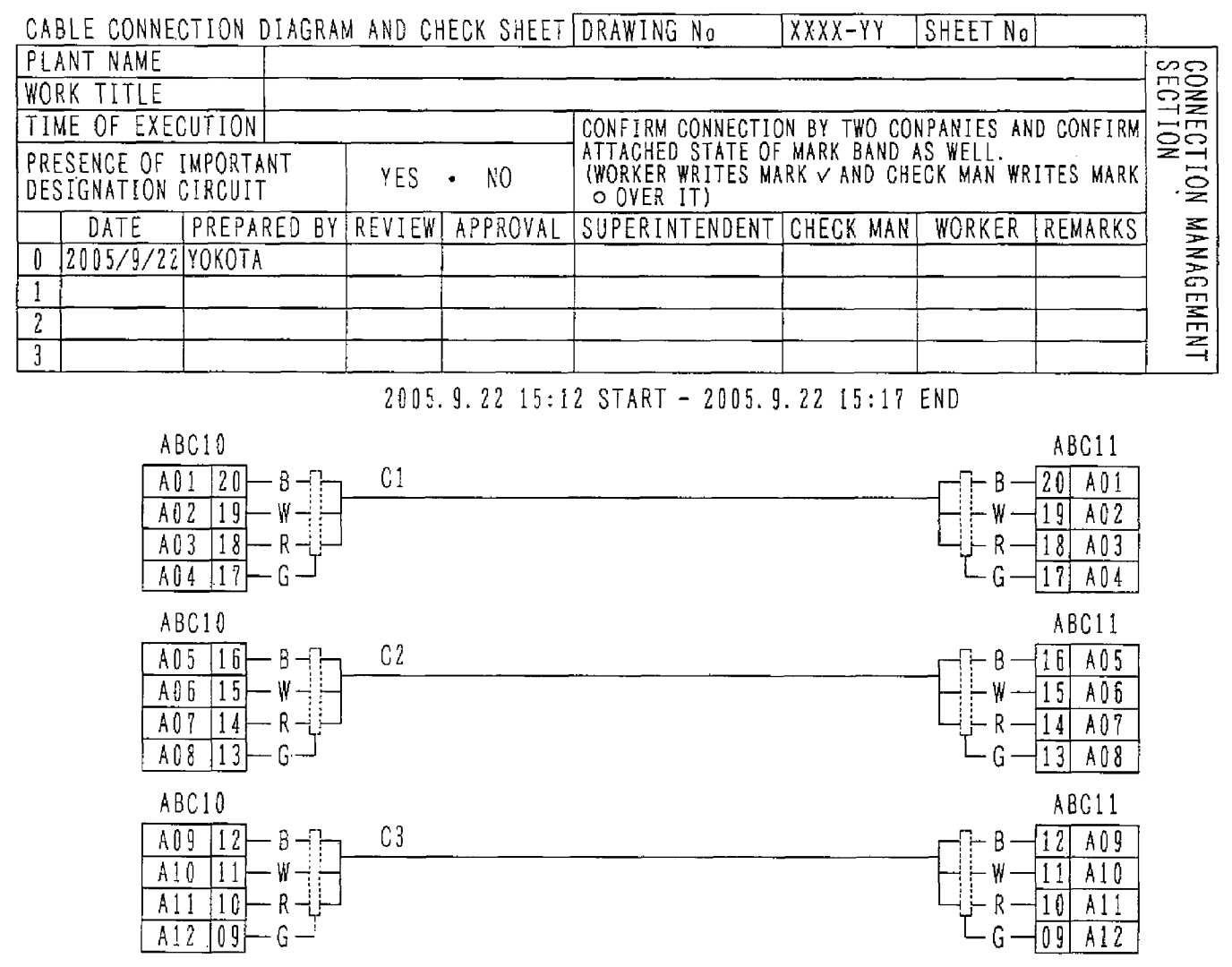

FIG. 19 shows a screen example in the confirmation mode. To input the situations of cable connections, the RFIDs of cables connected in the order of the terminal number in the terminal block are read and, for the terminals to which are not connected the cables, the RFIDs attached to those terminals are read. As another method for inputting the situations of cable connections, the RFIDs of cables connected to the RFIDs of the terminal block may be read two by two. When the user (worker) depresses a "PRINT" button located in a lower area of the screen after inputting the situations of cable connections, a work report is automatically formed, as shown in FIG. 20, in accordance with a program. With such a function, the user can easily prepare the work report. Also, by storing the time when the confirmation mode was started or the time when the RFID of the cable connected to the first terminal was read, and the time when the RFID of the cable connected to the last terminal was read or the time when the confirmation mode was ended, and by automatically entering the stored data and time in the work report, the work report can be handled as the evidence indicating execution of the relevant work.

When the PC 2 updates data which is stored in the data storage 3 periodically or as required and which can be shared by other persons via a network, both sides are required to have the communication function. As another method, data may be transferred between the PC 2 and the data storage 3 by downloading the data to the PC 2 from the data storage 3 prior to the start of work, locally updating and storing the data in the PC 2 during the work, and uploading the stored data after the end of the work. In such a case, guarantee information is required to be also uploaded at the same time. The guarantee information includes, for example, "information guaranteeing that the attached RFIDs are matched with the RFID information" based on the allocating operation described with reference to FIG. 16, "information guaranteeing that the test results are matched with the RFID information" based on the operation of the sequence test described with reference to FIG. 11, and "information guaranteeing that check of the connection situations in comparison with the diagram using the RFIDs has been completed". In addition, the degree of progress and the log are required to be also uploaded to the data storage 3.

Thus, the system of the present invention has the advantage that since correspondence information between IDs used in the circuit information, such as design data, and the RFIDs attached to actual objects is held as data on the system side, it is possible to confirm which part of the circuit information is now under work by referring to the held data based on the RFID read by using the reader, and to aid the work with no necessity of writing any data in the RFID.

Also, since the system of the present invention has the read function on the operating terminal side, the reader function is no longer required to be prepared for each terminal block, and therefore the cost can be cut.

Further, according to the system of the present invention, since the correspondence information between IDs used in the circuit information, such as design data, and the RFIDs attached to actual objects is held as data on the system side, the sequence test can also be aided by reading the RFID, which corresponds to a certain part in the sequence diagram representing the circuit information, during the work.

In addition, by employing LED plates attached to casings and the above-described confirmation mode, the present invention can also be applied to applications in which it is essential to navigate positions and to confirm arrival to each position, such as whack-a-mole game.

What is claimed is:

1. An RFID cable system comprising
a cable, a plurality of RFID tags being attached to said cable in a predetermined order; and
a data storage for storing information stored in said plurality of RFID tags and information of an arrangement order of said plurality of RFID tags attached to said cable, said data storage being arranged at an outside of said cable;
wherein said data storage stores new cable identification name and information stored in RFID tags arranged on a newly manufactured cable or information stored in an RFID tag arranged on a portion near to a cut portion of said RFID cable which has been cut, said data storage stores said new cable identification name, said information stored in RFID tags, and said information of the arrangement order of said plurality of RFID tags.

2. The RFID cable system of claim 1,
wherein each of said RFID tags has an ID, said RFID tags are arranged in a longitudinal direction of said cable; and
a database for storing a plurality of said IDs of said RFID tags bonded to said cable, and the order of said RFID tags bonded to said cable,
wherein said RFID tags are arranged on a ribbon in accordance with said order, and said ribbon is included in said cable.

3. The RFID cable system according to claim 2, further comprising:
a processing unit for receiving information stored in any one of said RFID tags arranged on said cable, and for searching information stored in said database to obtain a cable identification name.

4. The RFID cable system of claim 1, further comprising:
a display screen; and
a processing unit for receiving a cable identification name of a cable to be removed, and for receiving information stored in any one of said RFID tags arranged on said cable, and for searching information stored in said data storage to obtain a cable identification name, and for displaying a message indicating removal on said display screen when said cable identification name stored in said data storage is said cable identification name of said cable to be removed, and for displaying a message indicating no removal on said display screen when said cable identification name stored in said data storage is not equal to said cable identification name of said cable to be removed.

5. A method for using an RFID cable system comprising the steps of:
attaching a plurality of RFID tags on a cable in a predetermined order; and
storing information sorted in said plurality of RFID tags and information of an arrangement order of said plurality of RFID tags attached to said cable into a data storage arranged at an outside of said cable;
wherein said data storage stores new cable identification name and information stored in RFID tags arranged on a newly manufactured cable or information stored in an RFID tag arranged on a portion near to a cut portion of said RFID cable which has been cut, said data storage stores said new cable identification name, said information stored in RFID tags, and said information of the arrangement order of said plurality of RFID tags.

6. The method for using an RFID cable system of claim 5, further comprising the steps of:
arranging a plurality of RFID tags on a ribbon in a predetermined order; each of said RFID tag has an ID,
bonding said ribbon to a cable in accordance with said order, said RFID tags are arranged in a longitudinal direction of said cable; and
storing, in a database, information corresponding to each RFID including an ID of each RFID, and the order of said RFID tags bonded to said cable.

7. The method for using an RFID cable system of claim 6, further comprising the steps of:
receiving information stored in any one of said RFID tags arranged on said cable, and
searching information stored in said database to obtain a cable identification name.

8. The method for using an RFID cable system of claim 5, further comprising the steps of:
receiving a cable identification name of a cable to be removed by a processing unit,
receiving information stored in any one of said RFID tags arranged on said cable, by the processing unit,
searching, by the processing unit, information stored in said data storage to obtain a cable identification name; and
displaying a message indicating removal on a display screen when said cable identification name stored in said data storage is said cable identification name of said cable to be removed, and displaying a message indicating no removal on said display screen when said cable identification name stored in said data storage is not equal to said cable identification name of said cable to be removed.

* * * * *